United States Patent [19]

Chovan

[11] Patent Number: 5,305,135
[45] Date of Patent: Apr. 19, 1994

[54] UNDERWATER VIEWING SYSTEM FOR REMOTE PILOTED VEHICLE

[75] Inventor: Joseph L. Chovan, North Syracuse, N.Y.

[73] Assignee: General Electric Company, Syracuse, N.Y.

[21] Appl. No.: 845,684

[22] Filed: Mar. 4, 1992

[51] Int. Cl.$^5$ .................................. G02B 26/08
[52] U.S. Cl. .................. 359/202; 359/485; 359/900; 250/225
[58] Field of Search ............... 359/201–203, 359/205, 212–220, 223, 226, 368, 369, 371, 372, 385, 386, 492, 494, 495, 900, 485; 250/225

[56] References Cited

U.S. PATENT DOCUMENTS

| | | | |
|---|---|---|---|
| 3,614,314 | 10/1971 | Rossire | 178/7.88 |
| 3,760,096 | 9/1973 | Roth | 178/5.4 E |
| 3,941,923 | 3/1976 | Wheeler | 178/6.8 |
| 4,097,115 | 6/1978 | Garwin et al. | 358/206 |
| 4,349,815 | 9/1982 | Spooner | 340/705 |
| 4,437,113 | 3/1984 | Lee et al. | 358/93 |
| 4,445,126 | 4/1984 | Tsukada | 346/108 |
| 4,474,422 | 10/1984 | Kitamura | 359/217 |
| 4,547,038 | 10/1985 | Mori | 359/213 |
| 4,794,452 | 12/1988 | Taft et al. | 359/212 |
| 4,897,715 | 1/1990 | Beamon, III | 358/93 |
| 4,932,044 | 6/1990 | Williams et al. | 359/392 |
| 5,032,720 | 7/1991 | White | 359/368 |
| 5,035,476 | 7/1991 | Ellis et al. | 359/202 |
| 5,149,969 | 9/1992 | Fouilloy et al. | 359/201 |

FOREIGN PATENT DOCUMENTS

WO9000755 1/1990 World Int. Prop. O. ......... 359/201

Primary Examiner—Bruce V. Arnold
Assistant Examiner—James Phan
Attorney, Agent, or Firm—Paul Checkovich; Stephen A. Young

[57] ABSTRACT

An underwater viewing system includes a dry and wet end. Illumination energy is provided to the wet end where it is scanned and the resulting scanned illumination is directed to a scene of interest. Energy reflected from the scene is received by the wet end where it retraces the path of illumination to the dry end. The received energy is directed to a detector and ultimately to a video processor. The wet end may be disposed in a remote piloted vehicle with optical waveguide payed out from the dry end to supply the illumination and to conduct the received energy. Communication information may be transferred between the dry and wet end may be over the same path followed by the illumination energy but at a different frequency. The illumination and communication energy may be separated based on their frequency. A polarization device may be provided for maximizing the amount of received energy that is provided to the detector.

11 Claims, 3 Drawing Sheets

UNDERWATER VIEWING SYSTEM FOR REMOTE PILOTED VEHICLE

BACKGROUND OF THE INVENTION

This invention relates to an underwater viewing system for a remote piloted vehicle (RPV), and, more particularly, to a small lightweight viewing system wherein a source of illumination is provided to the RPV from a remote platform.

Although the present invention has general applicability for any viewing system, such as one which may be contained on an underwater RPV and used in preparation for salvage operations to observe the remains of the hull of a sunken ship or for viewing the underwater path in advance of own ship, it is especially well suited for deployment on a defensive-type torpedo.

Small torpedoes exist which have sufficient speed and maneuverability to intercept and destroy an incoming torpedo that is homing in on a base ship or other target. Such a chase—or defensive intercept torpedo requires a suitable sensing system which permits command and guidance information to be generated in response to the sensed information in order to accomplish its mission.

Sonar or acoustic based sensors require a significant delay time with respect to the anticipated speed of the incoming torpedo for an acoustic signal to propagate between the target or incoming torpedo and the acoustic receiver of the intercept or chase defensive torpedo. This delay time may detrimentally affect the response time of the chase torpedo. An optical sensor would overcome problems related to acoustical propagation delays because of the negligible propagation time of light through the transmitting medium with respect to the speed of the incoming torpedo.

An underwater viewing system should be capable of delivering sufficient light to the scene of interest for enabling sensing of the environment with the desired resolution and signal-to-noise ratio for any light returned from the scene. A significant problem for optical viewing are turbid conditions of the transmitting medium, such as may be experienced for large turbulent bodies of water, or water susceptible to contaminants or natural optical disturbances, such as silt from water runoff from land, is that the light being used to illuminate the scene is subject to back-scatter due, at least in part, to particulate matter that is disposed and suspended in the intervening transmitting medium between the source of light and the target. This phenomenon is analogous to requiring the viewing system to look through an atmospheric fog.

Prior optical systems have used range gated image intensifiers and an optical pulsed-radar type system to try to minimize the volume of water that is being analyzed and/or to establish the actual range to a target. Such techniques often require electronics and optics that may not conveniently be packaged in an intercept torpedo without potentially disturbing its maneuverability and response characteristics.

SUMMARY OF THE INVENTION

In accordance with the present invention, an illumination system comprises first scanning means for scanning illumination energy in a first direction for generating first scanned illumination, second scanning means for scanning the first scanned illumination in a second direction for generating second scanned illumination, the first and second direction being different from each other, and first and second generator means for generating a first and second termination signal, respectively, in response to second scanned illumination incident on the first and second generator means, respectively. The first and second termination signals are indicative of the end of a scan in the first and second directions, respectively, which directions may be orthogonal each other.

The first and second generator means may each include means for reflecting a portion of the second scanned illumination. The system may include a source of illumination energy, such as energy in the visible range, which may be pulsed.

The first and second energy scanning means may include a respective first and second plurality of rotatable energy reflective elements, such as may be arranged as the sides of a multi-faceted prism. The first and second plurality of elements are rotatable at a nominal first and second rate, respectively. The first plurality of elements receives illumination energy and reflects it as the first scanned illumination and the second plurality of elements receives the first scanned illumination and reflects it as the second scanned illumination when the first and second plurality of elements are rotating. The respective rates may be suitably selected to provide a conventional horizontal/vertical scan pattern for the second scanned illumination.

In another aspect of the present invention, a viewing system for illuminating an object with illumination and for detecting energy reflected from the object comprises first scanning means for scanning the illumination energy in a first direction to form first scanned illumination energy, second scanning means for scanning the first scanned illumination energy in a second direction to form second scanned illumination energy, with the second direction being different from the first, projection means for directing second scanned illumination energy toward the object and for receiving energy such as may be reflected from the object and detector means optically coupled to the projection means for detecting the received energy. Video processor means may be connected to the detector means for generating video in response to the detected received energy.

The system may further include polarization control means disposed in optical flow communication between the projection and detector means with the polarization control means for controlling polarization of the received energy so that the amount of received energy provided to the detector means may be maximized. A polarization servo means having an input coupled to an output of the detector means and an output connected to an input of the polarization control means may be included in the system for maximizing the amount of received energy that is provided to the detector means in response to the amount of energy detected by the detector means.

The system may also include first and second generator means for generating a first and second synch signal, respectively, in response to the second scanned illumination signal, with the first and second synch signal being indicative of the end of the scan in the first and second direction, respectively. The first and second synch signals may include a respective portion of the second scanned illumination energy and are supplied to the detector means for delimiting the extent of scan in the first and second direction, respectively. The first and second synch pulse generator means may include first and second reflecting means, respectively, for reflecting the respective portion of the second scanned illumination.

In yet another aspect of the present invention, a viewing system for illuminating an object with illumination energy and for detecting energy reflected from the object, comprises a dry end including detector means for detecting received energy and a wet end. The wet end includes first mechanical scanning means for scanning the illumination energy in a first direction for forming first scanned illumination energy, second mechanical scanning means for scanning the first scanned illumination energy in a second direction for forming second scanned illumination energy, with the second direction different from the first direction, projection means for directing the second scanned illumination energy toward the object and for receiving energy reflected from the object, and energy coupling means connected between the dry and wet end for supplying illumination energy to the wet end and for providing received energy to the dry end.

The illumination may be at a first frequency while the dry end further includes first communication means for supplying first information in the form of encoded energy at a second frequency to the wet end via the energy coupling means. The second frequency is different from the first frequency. The wet end may further include second communication means for supplying second information in the form of encoded energy at a third frequency to the dry end via the energy coupling means. The third frequency is different from the first frequency. The dry end may also include a source of energy for providing the illumination energy, which may be in the visible range and pulsed.

The dry end may further include first energy separation means for directing received energy and second information over a first and second energy path, respectively, in response to the third and first frequency, respectively. The wet end may further include second energy separation means for directing second information and illumination energy over a third and fourth path, respectively, in response to the second and first frequency, respectively. The first energy path is different from the second energy path and the third energy path is different from the fourth energy path.

The first communication means may include first receiver means having a port coupled to the second energy path and the second communication means may include second receiver means having a port coupled to the third energy, wherein the first and second receiver means are for decoding the first and second information, respectively.

The dry end may further include polarization control means disposed in energy flow communication between the projection means and the detector means for controlling the polarization of the received energy so that the amount of received energy provided to the detector means may be maximized. The dry end may yet further include polarization servo means having an input coupled to an output of the detector means and an output connected to an input of the polarization control means for maximizing the amount of received energy provided to the detector means in response to the amount of energy detected by the detector means.

The first and second scanning means may include a respective first and second plurality of rotatable energy reflective elements with the first and second plurality of reflective elements rotatable at a nominal first and second rate, respectively. The first plurality of elements are for receiving illumination energy and for reflecting the received illumination energy as the first scanned illumination when the first plurality of elements is rotating. The second plurality of elements are for receiving the first scanned illumination and for reflecting the received first scanned illumination as the second scanned illumination, when the second plurality of elements is rotating. Synchronization between the first and second rate is not necessary such as when the first and second synch signals are used.

The wet end may be carried by a remote piloted vehicle, such as a tethered torpedo. The energy coupling means may form the tether. The energy coupling means may include flexible optical waveguide that may act as a tether to the wet end as it is payed out for maintaining energy flow communication between the wet and dry end during operation.

In still another aspect of the present invention, a method for illuminating an object comprises scanning illumination energy in a first direction for generating first scanned illumination, scanning the first scanned illumination in a second direction for generating second scanned illumination, generating a first termination signal indicative of the end of a scan in the first direction in response to a first portion of the second scanned illumination, generating a second termination signal indicative of the end of a scan in a second direction in response to a second portion of the second scanned illumination, wherein the first and second direction are different from each other, and directing the second scanned illumination toward the object.

The step of scanning illumination energy may include reflecting the illumination energy from a first plurality of rotatable elements as the first scanned illumination and the step of scanning the first scanned illumination may include reflecting the first scanned illumination as the second scanned illumination when the first and second plurality of elements are rotating. In addition, the method may include pulsing the illumination energy.

In yet another aspect of the present invention, a method for illuminating an object and for detecting energy reflected form the object comprises scanning the illumination energy in a first direction to form first scanned illumination energy, scanning the first scanned illumination energy in a second predetermined direction to form second scanned illumination, with the second direction different from the first direction, directing the second scanned illumination toward the object, receiving energy reflected from the object, including second scanned illumination, if any, and detecting the received energy.

The method may further include the step of controlling the polarization of received energy before detecting may be maximized. The method may also include generating video in response to energy detected.

The method may further include the steps of generating a first synch signal in response to the second scanned illumination energy, such as by reflecting a portion of the second scanned illumination, with the first synch signal indicative of the end of a scan in the first direction, generating a second synch signal in response to the second scanned illumination energy, such as by reflecting a portion of the second scanned illumination, with the second synch signal indicative of the end of a scan in the second direction and detecting the first and second synch signals for delimiting the extent of scan in the first and second direction, respectively.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the detailed description taken in connection with the accompanying drawing in which:

DETAILED DESCRIPTION

Figure 1:
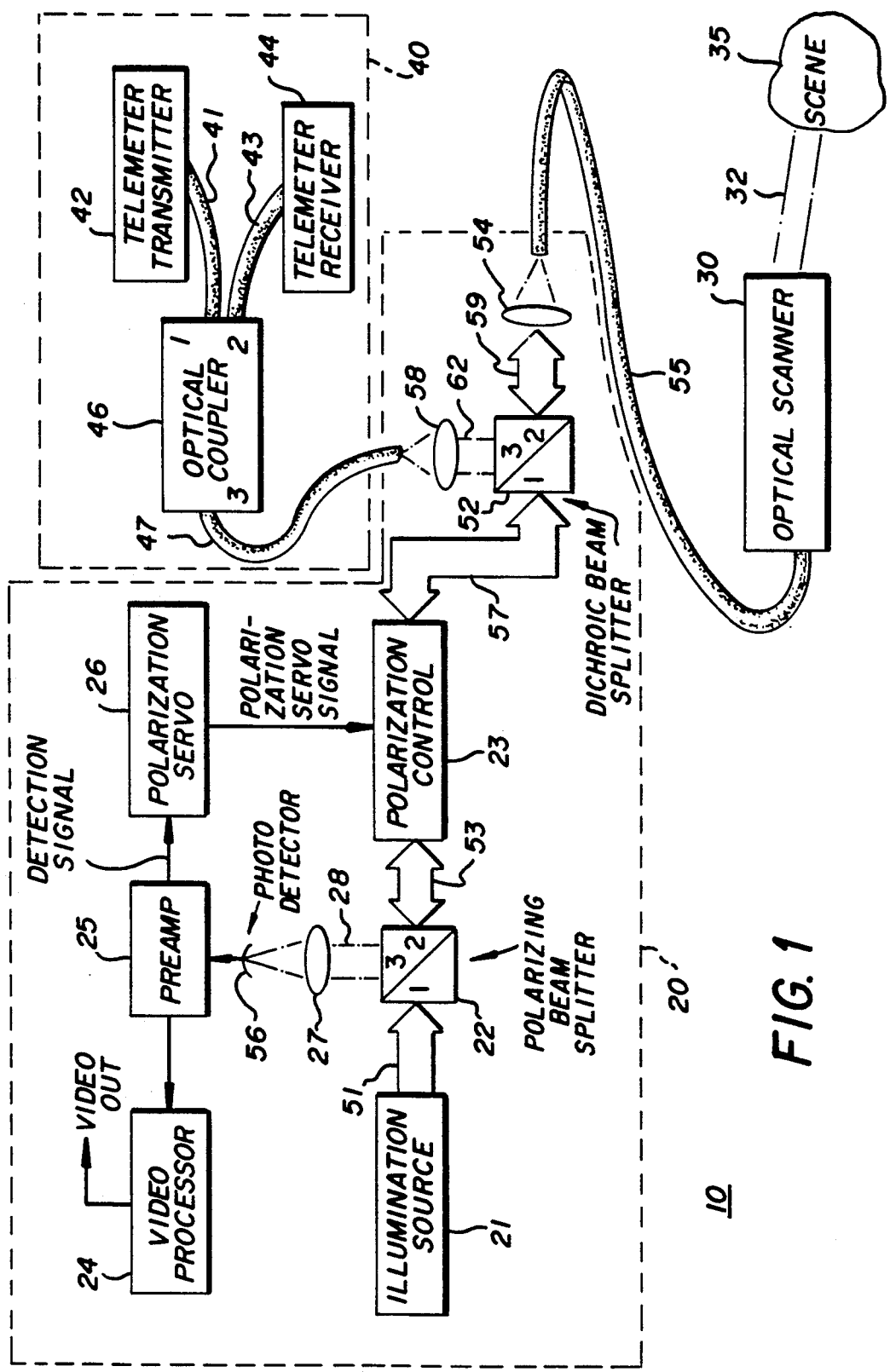
FIG. 1 is a schematic block diagram of a remote viewing system in accordance with the present invention.

Referring to FIG. 1, a schematic block diagram of a remote viewing system in accordance with the present invention is shown.

Viewing system 10 includes a transmitter/processor, or dry end, 20, an optical scanner, or wet end, 30 and communications circuitry 40. The term "dry" and "wet" are used conventionally to refer to the usual disposition of the system. That is, the wet end is generally operationally disposed in the transmitting medium, such as water, while the dry end is typically disposed on a remote platform, such as a ship or boat. Conventionally, communication circuitry 40 may be subsumed under the term "dry end".

Transmitter/processor 20 includes an illumination source 21, such as a neodymium YAG laser, whose output is optically connected to polarization control circuitry 23. The optical path from source 21 to control circuitry 23 sequentially includes an optical communication path 51, which may be bilateral, such as empty space, or unidirectional to permit substantially unattenuated energy flow away from source 21, a polarizing beam splitter 22 with port 1 connected to the output of source 21 via path 51, and a bilateral optical communication path 53, such as empty space. A port of polarization control circuitry 23 is connected to port 2 of beam splitter 22 via optical communication path 53. Linear input polarization of the light that is obtained from source 21 is oriented such that essentially all such light passes internally from port 1 to port 2 of splitter 22. Optical paths recited herein ensure that there is optical flow communication among the components as noted.

Another optical path which is useful in the receive mode, is connected to port 3 of splitter 22. This optical path includes a coupling focusing lens 27 optically connected to port 3 of beam splitter 22 via an optical communication path 28, such as empty space, and to a photodetector 56 having photo detecting means for receiving illumination that is directed thereon by splitter 22 and lens 27.

Laser 21 emits electromagnetic energy, such as visible light or illumination, at a predetermined frequency when stimulated, or may have the frequency of its primary energy output manipulated, such as by multiplication, either internal to source 21 or in an external device (not shown) for obtaining the desired frequency of light, as is known to one of ordinary skill in the art. Laser 21 may be intermittently stimulated or otherwise controlled to emit pulses of energy so that processing of signal returns may occur in the dead time or non-transmit time between pulses. The energy emitted by laser 21 may be of any frequency. However, it is preferred that the frequency be one which propagates well in the transmitting medium without undue dispersion and attenuation.

The output from photodetector 56, typically having an electronic signal available thereat, wherein the magnitude of the voltage and/or current of the electronic signal is indicative of the amount of illumination energy that impinges photodetector 56, is connected to the input of a preamplifier 25 designated as preamp. Thus, photodetector 56 converts electromagnetic energy of a predetermined frequency range that is incident thereon to a corresponding electrical signal that is provided to preamp 25.

Illumination from port 2 of beam splitter 22 is directed to port 1 of dichroic beam splitter 52 along bilateral optical communication paths 53 and 57, and through intermediately disposed polarization control device 23. Communication path 57 may be the same as path 53. Polarization servo circuitry 26 includes an input connected to an output of preamp 25 for receiving an electronic signal and an output connected to an input of polarization control device 23 for providing an electronic polarization servo signal thereto. The signal received from preamp 25 by servo 26 and the polarization control signal supplied to polarization control device 23 may be analog, digital or other format as desired.

Polarization control device 23 is an optically bilateral device which rotates the plane of polarized light that passes through it in response to the value of the polarization servo signal and thus polarization control device 23 functions as an active polarization controller. Control device 23 includes a sequential pair or triple of Pockel cells depending on the maximum amount of polarization rotation deemed to be necessary, with each having its fast axis disposed at 45° with respect to the other fast axes.

A Pockel cell is an electro-optical device which has an electrically controllable difference in propagation time for two orthogonal components of polarization of the light or energy traveling through the cell. Such a difference in propagation delay for different polarization components is termed birefringence or double refraction. The difference in propagation delay acts to alter the polarization state of light which passes through the cell or birefringement material. When the fast axes of three such cells are oriented at 45° with respect to each other and the light is sequentially passed therethrough, respectively independent control voltages may be applied to each cell for converting any arbitrary polarization of the light that is applied to the input of one cell to any desired polarization for the light available at the output of the third cell by appropriate selection of the control voltages.

Dichroic beam splitter 52 is wavelength dependent such that it causes one frequency of energy, such as is available from source 21 at port 1 to pass internally from port 1 to port 2 while causing another frequency of energy, such as may be available from communications circuitry 40 at port 3, to be internally reflected so that it ultimately arrives at port 2 of splitter 52. Thus, the optical signal available at port 2 of beam splitter 52 may include a plurality of optical frequencies.

Beam splitter 52 is selected to be an optically bilateral device. That is, for optical energy having a plurality of optical frequencies, such as two, entering beam splitter 52 at port 2, as during the receive mode of viewing system 10, energy of one frequency may be internally directed from port 2 to port 1, while energy of the other frequency may be internally directed from port 2 to port 3.

Energy exiting from port 2 of beam splitter 52 is directed over bilateral optical communication path 59 to coupling, or collimating, lens 54. Energy exiting from port 2 of splitter 52 over bilateral optical communication path 59 is intercepted by lens 54 which directs it to converge so that the energy may enter one end of bilateral optical communications means 55. The other end of optical fiber 55 is connected to a port of optical scanner 30.

Illumination energy from source 21 is supplied by scanner 30 from a port thereof to illuminate a scene of interest 35. Transmitting medium 32 is shown schematically as a bilateral optical path. The same port of scanner 30 receives energy at the frequency of the illumination energy that is reflected from scene 35 through transmitting medium 32.

Communications means 55 may include a flexible multimode optical fiber or waveguide that may be payed out or deployed like a tether to maintain communication with optical scanner 30 during operation. A multimode fiber typically includes a plurality of speckles at its end which will generate a beam having an expanding or conical envelope upon leaving the end. A multimode fiber generally permits higher amounts of optical power, such as may be used for illumination in accordance with the present invention, to be conducted through it without entering an undesirable non-linear region that may be experienced if such higher power is attempted to be directed through a single mode fiber optic cable or optical waveguide.

Communication circuitry 40 includes telemeter transmitter circuitry 42, telemeter receiver circuitry 44 and optical coupler 46. The output of transmitter 42 is connected to port 1 of optical coupler 46 via optical communication path 41, such as optical fiber or waveguide, and the input of receiver 44 is connected to port 2 of optical coupler 46 via optical communication path 43, such as optical fiber or waveguide. Port 3 of coupler 46, which constitutes an output(transmit mode)/input(-receive mode) port of communication circuitry 40, is connected via optical communication path 47, such as optical fiber or waveguide, to a port of transmitter/-processor 20 that is internally optically coupled to coupling, or collimating, lens 58.

Transmitter 42 may include a semiconductor diode or laser (not shown) supplying energy having a frequency different from that available from illumination source 21 and that is directly internally modulated by a control signal (not shown). The modulating control signal of transmitter 42 is indicative of information or intelligence that is desired to be communicated to optical scanner 30 and ultimately to the torpedo or RPV. Such information which may be provided manually, or automatically through closed loop range and angle tracking, may include guidance steering commands, like fin controls, and drive motor speed indications for obtaining the desired direction and speed of movement of optical scanner 30. The modulated signal from transmitter 42 is directed from port 1 to port 3 through optical coupler 46, collimating lens 58 and into port 3 of beam splitter 52. The modulated signal is then internally reflected in splitter 52 to exit port 2 of splitter 52 where the modulated signal becomes coincident with the main optical path that is followed by illumination energy from source 21.

In the receive mode, optical scanner 30 provides detected energy to transmitter/processor 20 via optical fiber 55. The detected energy received from scanner 30 may include both energy at the frequency of the detected energy including that from illumination source 21 and energy at the frequency of the energy from communication circuitry 40 containing modulated energy having, for example, feedback information from the torpedo or RPV, such as fuel status and sensor data.

In the receive mode, return energy at the wavelength or frequency of the modulated signal from communication circuitry 40 and illumination source 21 exits communication means 55, passes sequentially through lens 54, along path 59 and enters port 2 of splitter 52. The portion of the return energy at the frequency of the modulated signal is internally reflected to exit at port 3 of splitter 52. From port 3 of splitter 52 the portion of the return energy passes along bilateral optical communication path 62, through lens 58, along path 47 to port 3 of coupler 46, internally to port 2 of coupler 46 and along optical path 43 to receiver 44. Receiver 44 may include a photodetector (not shown) analogous to photodetector 56 for converting the received energy into an electrical signal.

Continuing in the receive mode, the portion of the return energy at the wavelength or frequency of source energy from source 21 that enters port 2 of splitter 52 is internally directed to port 1 of splitter 52. From port 1 of splitter 52 the energy is directed to port 2 of splitter 22 via communication paths 57 and 53 and polarization control device 23. The return energy is internally reflected within splitter 22 to exit at port 3 of splitter 22 toward photodetector 56.

Closed loop control of the polarization of the polarization control signal that is supplied by polarization servo circuitry 26 to polarization control device 23 is used to cause the net polarization of the return energy received by control circuitry 23 to be linear and oriented such that ideally all return energy is directed from port 2 of splitter 22 internally to port 3, along path 28, through lens 27 and ultimately to photodetector 56. Such active closed loop control of the polarization control signal may be used to compensate for stress induced birefringence, or polarization change, that may dynamically alter the polarization of the source energy from source 21 as fiber 55 is uncoiled or payed out during deployment.

The error signal for closed loop polarization control may be derived by using a small dither or perturbation in the polarization servo signal voltages supplied by servo circuitry 26 to control device 23 and then monitoring the amplitude variations on the average value of the detection signal that is supplied to servo circuitry 26 by preamp 25. The amplitude of the detection signal is indicative of the intensity of the return signal from fiber 55 that occurs at the frequency of the signal from source 21. The value of the polarization servo signal from servo circuitry 26 is selected so that the average value of the detection signal is maximized.

Preamp 25 not only supplies a detection signal to servo circuitry 26, but also supplies an analogous signal to video processor 24. Video processor 24 is the subject of a U.S. Patent Application filed concurrently herewith entitled "Background Tracker for Underwater Viewing System" having Ser. No. 07/845,678, assigned to the same assignee as hereof and incorporated in its entirety herein by reference thereto.

It is to be understood that reference herein to a single or particular frequency includes a band or plurality of frequencies centered on or surrounding the designated frequency unless otherwise noted. The bandwidth of the frequencies may be selected in accordance with the teachings of this invention by one of ordinary skill in the art without undue experimentation.

Referring to FIG. 2A, an isometric schematic diagram of the optical scanner of FIG. 1 is shown.

Optical scanner 30 is shown disposed within a cylindrical housing 100, a portion of which is cut away for ease of viewing. Housing 100 may be part of, or further disposed within, a torpedo or RPV. Scanner 30 includes a central axis 115 which may be conveniently disposed to lie coincident with the central axis of housing 100.

Scanner 30 includes a collimating lens 102 which in the transmit mode accepts light from fiber 55 and collimates it so that it may propagate along the primary optical path 105 of scanner 30, which is indicated by a heavy dark line, without undue dispersion or convergence.

Dichroic beam splitter 104 is analogous to beam splitter 52 (FIG. 1). Light at the frequency of illumination from source 21 (FIG. 1) passes through splitter 104 to mirror 108, while light at the frequency of the communication signal from communication circuitry 40 is reflected or directed to data link circuitry 110, which is analogous to communications circuitry 40, through collimating lens 106. Data link circuitry 110 may include a receiver portion for decoding the communication signal from communication circuitry 40 to obtain command and guidance information and may further include a transmitter portion for encoding, such as by modulation, a light beam at a carrier or base frequency different from that of energy available from source 21 (FIG. 1) for providing information, such as torpedo or RPV status, for decoding back to communications circuitry 40 and receiver 44 thereof through lens 106 and beam splitter 104.

Beam splitter 104 is oriented so that light entering beam splitter 104 from data link 110 along optical flow path 107 is internally reflected and combined with light being returned from scanner 30 to transmitter/processor 20 through communications means 55. Thus, use of communications circuitry 40 and data link 110 in cooperation with dichroic beam splitters 52 and 104 provides a two-way data communication link between the wet and dry end of viewing system 10 (FIG. 1).

The collimated main illumination beam impinging on fixed plane mirror 108 is reflected to impinge a scanning mirror 145 of a rotatable polygonal prism 142 whose lateral sides include a plurality of scanning planar mirrors, or facets, 145. Prism 142 is fixedly connected to scan motor 140 which causes prism 142 to rotate in the direction of the arrow during operation. When rotating, prism 142 causes light reflected from mirror 142 whose plane is disposed parallel to central axis 115 to be scanned in a plane that is perpendicular or orthogonal to central axis 115.

Light impinging on prism 142 is reflected from, and scanned by, facet 145 in one direction until a next facet 145 intercepts the incident light rays, at which point in time the scan is reset or "flies back". It is anticipated that about 30 facets 14 will be adequate. As the number of facets is decreased, the scan angle increases, so that if reduced below a predetermined number of facets 145, the scan angle may become too large to catch or intercept with realistic sized lenses that are disposed downstream prism 142 in the transmit or illuminate mode.

Light reflected from mirror 145 passes through a first guiding lens 112, is directed to, impinges and is reflected from plane mirror 114, which constitutes one of an image twisting pair of mirrors, proceeds through consecutive guiding lenses 116 and 118 to be directed to, impinge upon and be reflected from plane mirror 120, which constitutes the other one of the image twisting pair of mirrors. Light reflected from mirror 120 impinges scanning mirror 155 of rotatable polygonal prism 152 after passing through guiding lens 122.

Prism 152 includes a plurality of lateral sides constituting scanning plane mirrors, or facets, 155. Prism 152 is fixedly connected to scan motor 150 which causes prism 152 to rotate in the direction of the arrow during operation. It is noted that the direction of rotation for prism 142 and 152 is shown as being the same with respect to central axis 115. However, such movement of prism 142 and 152 is not necessary, and, indeed, prism 142 and 152 may rotate in opposite directions with respect to central axis 115 if desired.

The same considerations that apply to facets 145 are applicable to facets 155. Thus, reset or "fly back" occurs as a next facet 155 is impinged by the light ray from prism 142 and the number of facets 155 is anticipated to be about 30. The number specified for facets 145 and 155 is not intended to be limiting but is provided by way of example only. The number of each of facets 145 and 155 may be independently selected and need not be equal. The system designer must be aware that trade-offs are possible, such that for a smaller number of facets 145 and/or 155 a larger scanning angle must be accommodated by providing lenses with larger irises or optical systems with other compensating features.

Reflected beam 109 from mirror 145 of prism 142 is scanned in, or directed along, a predetermined first direction that is perpendicular to axis 115. Mirrors 114 and 120 are disposed with respect to each other such that the first direction scan is parallel to axis 115 when the illumination beam impinges mirror 155 of prism 152. As shown, for achieving rotation of the first scanning direction, the optical path from mirror 145 of prism 142 to mirror 155 of prism 152 takes the general shape of a block U with mirrors 114 and 120 disposed at the intersection of the base and upstanding leg of the U, respectively.

Guiding lenses 112, 116, 118 and 122 cooperate to image or transfer the light spot that represents the main beam and appears on mirror 145 to a corresponding spot on mirror 155. The number of guiding lenses used is somewhat arbitrary. Fewer guiding lenses result in larger lens diameter requirements to capture the entire angularly scanning beam. More guiding lenses reduce the aperture size requirement for each guiding lens.

When rotating, prism 152 causes light reflected from mirror 155 whose plane is disposed parallel to central axis 115 to be scanned in a plane that is perpendicular to central axis 115. Light reflected from mirror 155 of prism 152 is thus scanned simultaneously in two orthogonal directions in response to rotatable prisms 142 and 152.

Light reflected from mirror 155 is directed to impinge a flat folding mirror 124 from which the light is again reflected and directed through image forming lens 126 onto another flat folding mirror 127. Lens 126 changes angle or scan information into position information at its focal plane. The beam reflected from mirror 127 is directed to impinge yet another flat folding mirror 128. It is noted that mirrors 127 and 128 do not change the shape or focus of the beam, but merely change its direction. Thus, depending on the actual physical configuration of the components of optical scanner 30, a lesser or greater number of folding mirrors may be used to obtain the desired ultimate orientation and positioning of the beam.

The beam reflected from mirror 128 is directed through a field lens 130 to a projection lens 132. Field lens 130 is disposed in or near the plane of the image that is formed by lens 12 6 and may be conveniently disposed transverse to and centered on central axis 115 of scanner 30. Lens 130 accepts the beam from mirror 128 and converges or redirects it into a narrower beam for interception by projection lens 132. This prevents the scanning beams from missing back input aperture 133 of lens 132. Lens 132 directs the beam to the transmitting medium and ultimately to the scene of interest 35 (FIG. 1).

Figure 2:
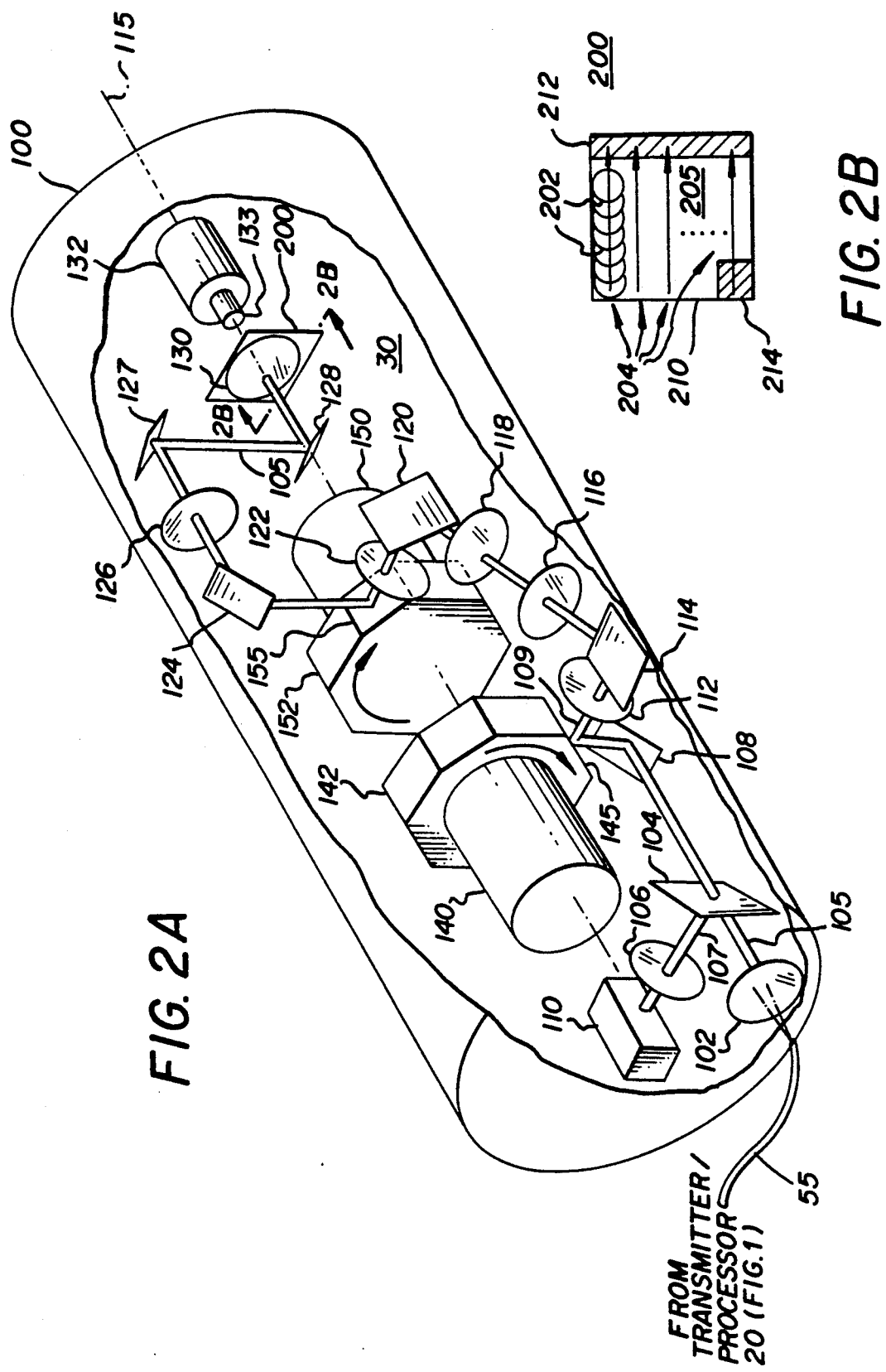
FIG. 2A is an isometric schematic diagram of the optical scanner component of FIG. 1.
FIG. 2B is a plan elevational view, not necessarily to scale, looking in the direction of the arrows of labelled 2B in FIG. 2A.

Due to the video synchronization signals that are generated in accordance with the present invention, which are explained in detail in conjunction with the description of FIG. 2.B, it is not necessary that motor 140 and motor 150 be synchronized to each other. That is, each of motors 140 and 150 may be free running and set to operate at a nominal rotational frequency.

For the configuration shown in FIG. 2.A, motor 140 drives prism 142 which determines the vertical scan rate and may rotate up to 30,000 rpm or more, while motor 150, which drives prism 152 for determining the horizontal scan rate may rotate at about 60 rpm, more or less. The actual rotational frequency for each of motors 140 and 150 will be dependent on the number of respective facets 145 and 155, respectively, and on the ultimate resolution desired, i.e., number of horizontal lines desired per frame of illumination/display. In addition, the functions of motors 140 and 150 and associated prisms 142 and 152, respectively, may be reversed from that shown so that motor 140 produces the horizontal scan and motor 150 produces the vertical scan. Of course, the speeds of motors 140 and 150 must be set accordingly.

In the transmit mode, for a single pulse of energy from source 21, the beam forms a generally circular spot somewhere in the image plane of lens 126 that is situated at or near lens 130. Successive pulses of energy may be temporally spaced so that the resulting circular spots scan an overlapping pattern of such spots (analogous to a TV raster) along a horizontal line in the image plane of lens 126.

Each spot is received by and projected from lens 132 as a nominally collimated beam into the water, much like a slide projector projects an image onto a viewing screen. For distant ranges, the spot remains in focus (i.e., the beam remains collimated) over all such distant ranges. For closer regions of interest, projection lens 132 may be motor driven to alter the distance between lens 132 and lens 130 for refocusing the spot at the range of interest.

In addition, lens 132 may include a zoom feature for changing the angular field of view of scanner 30 if desired. A large field of view can be used for target acquisition and lens 132 can then be adjusted or zoomed to a longer focal length which provides a narrower field of view but increased target detail.

During optical transit time from source 21 (FIG. 1) to scene 35 (which may include a target) and return to photodetector 56, scanning prisms 145 and 155 may be considered as essentially stationary for all practical rotational rates and viewing ranges. Thus detected light returning from the water retraces transmission path 105 of the main beam through scanner 30.

In the receive mode, projection lens 132 is provided with and/or intercepts energy returned from scene of interest 35 and directs it along main optical path 105 of scanner 30 in a reverse direction from the transmit mode as described above. The returned or detected energy is supplied to communication means 55 for delivery to transmitter/processor 20 and ultimately to photodetector 56 (FIG. 1).

Referring to FIG. 2B a plan elevational view, not necessarily to scale, looking in the direction of the arrows labelled 2B in FIG. 2A is shown.

Synch pulse generator 200 includes a flat transparent member 210, such as plate glass or plastic, having a horizontal synch pulse generator 212 and a vertical synch pulse generator 214 associated therewith. Synch pulse generator 212 and 214 may each include a material, such as white or reflective paint, or a metallic, such as silver or aluminum coating, which partially or totally reflects energy, such as from source 21, (FIG. 1) incident thereon. Synch pulse generator 212 and 214 may be disposed on the flat surface of member 210 or embedded within member 210. Alternatively, member 210 may be doped or include a non-homogenous material for providing the desired degree of reflection. The flat surface of member 210 is shown disposed at the image plane. Member 210 supports or carries pulse generator 212 and 214 in a fixed position with respect to path 105.

Horizontal synch pulse generator 212 is disposed at the right side, or at the end, of a horizontal scan line 204, several of which are shown. The number of horizontal scan lines 204 and vertical spacing between them is a function of the relative rates of rotation of prisms 145 and 155 (FIG. 2A) and may be selected by one of ordinary skill in the art without undue experimentation.

Individual illumination pulses 202 from source 21 (FIG. 1) are shown as circles along upper illustrated scan line 204. Successive pulses 202 preferably overlap the immediately preceding pulse 202 for ensuring complete illumination of frame 205 that is representative of the scene of interest.

Vertical synch pulse generator 214 is disposed at the lower left corner, or at the beginning, of the last horizontal scan line 204. Generator 214 is selected to be less than a predetermined vertical height so that only one scan line 204 will impinge thereon and is further selected to extend at least a minimum distance horizontally, or along scan line 204, to ensure that a plurality of successive illumination pulses 202 will impinge thereon.

The terms horizontal and vertical are used in their conventional sense throughout when referring to an orthogonal raster scanning scheme, and are not to be interpreted as limiting or restricting operation of the present invention to any particular physical orientation or environment.

During operation, a portion of energy from source 21 (FIG. 1) will be reflected back from synch pulse generator 212 and 214. The reflected energy is preferably small in relation to the total available energy, the remainder of which is used to illuminate the scene of interest. The strength of the reflected signal from generator 212 and 214 need only be large enough to dominate or exceed the strength of the signal detected from the scene of interest. That is, the amplitude of the reflected signal should be greater than a predetermined minimum signal, wherein the minimum signal is equal to or greater than the maximum amplitude of the signal detected from the scene of interest.

For the embodiment shown in FIG. 2B, the horizontal synch pulse signal will include one pulse while the vertical synch pulse signal will include a plurality of pulses from a corresponding plurality of successive illumination pulses 204. This relationship is shown in detail in FIG. 3.

Figure 3:
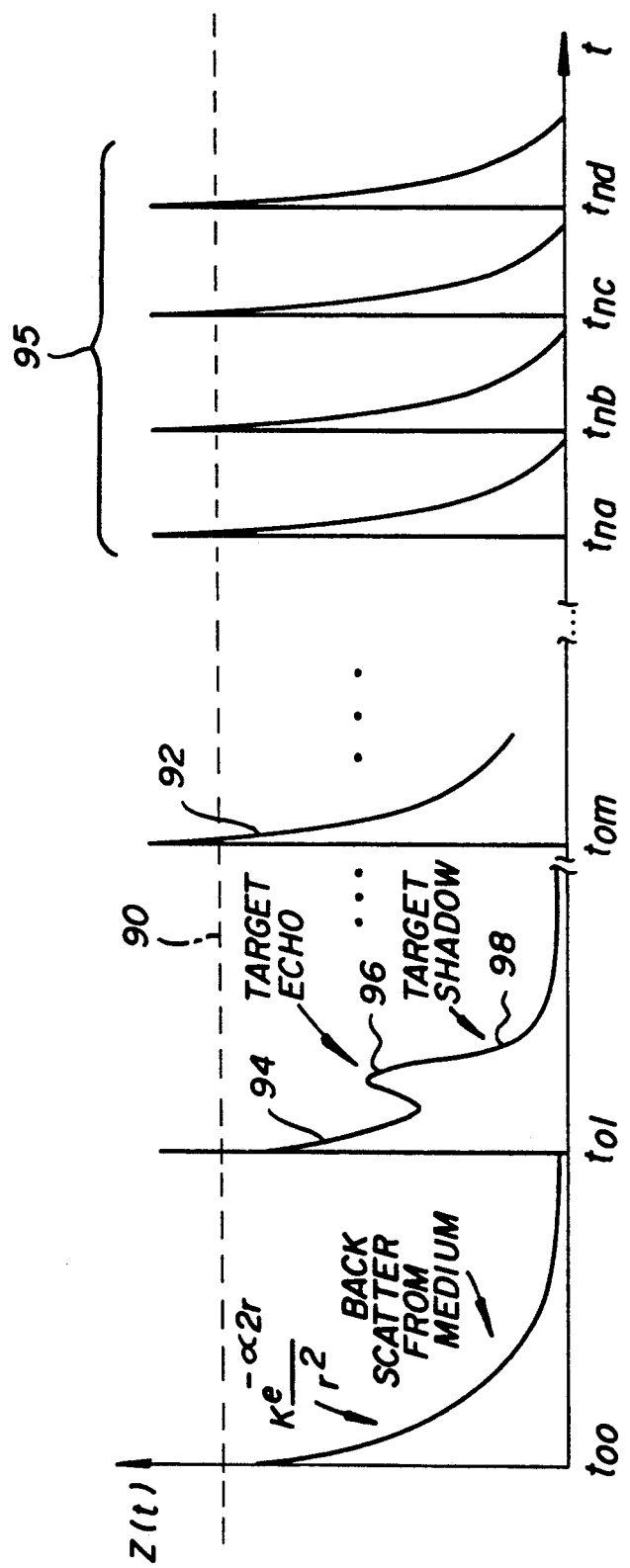
FIG. 3 is a graphic diagram of representative waveforms that may be generated and/or detected by the viewing system of FIG. 1.

Referring to FIG. 3, a graphic diagram of representative waveforms that may be generated and/or detected by the viewing system of FIG. 1 is shown.

Representative waveforms that are useful for an understanding of the present invention are shown on a system of coordinate axes wherein the ordinate is designated z(t) and the abscissa is identified as time t.

A representative waveform of the form $Kexp\text{-}a2r$ that results from back scatter by the transmitting medium of a pulse of energy from an illumination source is shown as occurring between time $t_{00}$ and time $t_{01}$. When the source of illumination includes a plurality of sequential pulses, input signal z(t) to video processor 24 (FIG. 1) includes a corresponding plurality of sequential waveforms in the same order.

The subscripts for time t are shown to facilitate identification of a particular pulse and are used with respect to an ultimate raster display of the information, although they may be otherwise identified and the present identification is not to be taken to limit such other identifications or display format. For the subscripts shown, the first subscript represents the row or line of a raster in which information representative of a signal may be displayed and the second subscript represents the position or pixel along a specific line at which the signal is displayed.

For display purposes, a convenient format, such as a typical horizontal/vertical raster scan, may be desired. In order to achieve such a raster scan, illumination from source 21 (FIG. 1) may be swept in a predetermined first direction along a line, say horizontal, across the scene for a predetermined distance, angular displacement, time or number of pulses. At the end of the desired length of a line of scene illumination, the illumination from source 21 may be directed, such as by optical scanner 30 (FIG. 2), to sweep the scene along a different horizontal line that is vertically displaced from the previous line. This process may be continued until the desired number of horizontal illuminating sweeps have been obtained, at which time the sweep may be reset or flown back to begin at the start of the initial horizontal line. The terms horizontal and vertical are used in their conventional sense to refer to mutually orthogonal axes. The actual true spatial orientation may be selected by the operator as desired.

In order for processor 24 (FIG. 1) to sense when the end of a horizontal line has been reached, a line reset, or horizontal synch, pulse 92, such as may be formed by generator 212 (FIG. 2A) in response to illumination from source 21 impinging thereon, and occurring at zero range, such as shown beginning at time $t_{0m}$, is transmitted along with the signal returns z(t) that are to be processed. Processor 24 recognizes such a pulse at zero range as a line reset signal whenever the amplitude of the pulse exceeds a predetermined threshold 90, which is indicated by a broken line. The amplitude of threshold 90 is set to be larger than the expected maximum return signal from the background and/or a target. Thus, a reset pulse 92 will be sent to processor 24 at the end of each horizontal line of the frame.

After a predetermined number of horizontal lines n are swept by illumination from source 21, the illumination direction may be reset to begin sweeping a next frame at the start of the first horizontal line, which is referred to by a first subscript 0 (zero). In order for processor 24 (FIG. 1) to recognize when such a frame reset has occurred, a series of consecutive reset pulses, or a vertical synch pulse burst, 95, wherein each pulse is set to exceed threshold 90 at zero range, is sent to processor 24. Processor 24 interprets a plurality of consecutive pulses at zero range which exceed threshold 90 (four of such pulses 95 are shown, one of which may be from generator 212 and the others from generator 214) as a vertical synch reset, or frame reset, that indicates that the source scan is returning to the beginning of the first line subscripted 0. It is noted that the time interval between each of pulses forming burst 95 in FIG. 3 has been compressed for conserving space. Typically the interval between adjacent pulses, say $t_{nb}-t_{na}$, $t_{nc}-t_{nb}$ or $t_{nd}-t_{nc}$, will be the same as the interval shown between adjacent signal returns on the left side of FIG. 3, say $t_{01}-t_{00}$.

By use of horizontal synch pulse 92 and vertical synch signal 95, processor 24 (FIG. 1) is able to provide identification so that the ultimate display may present the detected signal in the form of the raster that is swept by the illumination from source 21. The raster will include a plurality n of lines with each line having a predetermined length including m pulse returns per line.

The signal return that is shown beginning at time $t_{01}$ has three major components. The leading portion 94 of the return follows the general contour of the signal beginning at time $t_{00}$, indicating that only background information is detected. At about one-quarter of the time interval from time $t_{01}$ to time $t_{02}$, the smooth decay of portion 94 is disrupted by a detected portion 96 of the return that exhibits an increase in signal strength. Such behavior is indicative of reflection of illumination from a solid object, or target. Once the target echo, or return, has reached its peak amplitude as the illumination scan traverses the impinged surfaces of the object, the detected signal decreases, as shown in portion 98.

Portion 98 is significant because it represents the shadow of the target. Regardless of what type of coating, covering, and/or surface contouring, such as dimpling or roughing, is applied to the surface of an object that may be illuminated in an attempt to camouflage such surface and thereby the object, if the object is opaque, or partially so, or translucent, a shadow of the object will be created because not all source illumination will be able to pass through it. This shadow is also detectable using the teachings of the present invention.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A viewing system for illuminating an object with illumination energy and for detecting energy reflected from the object, comprising:

first scanning means for scanning the illumination energy in a first predetermined direction to form first scanned illumination energy;

second scanning means for scanning the first scanned illumination energy in a second predetermined direction to form second scanned illumination energy, the second direction different from the first direction;

projection means for directing the second scanned illumination energy toward the object and for receiving energy reflected from the object;

detector means optically coupled to the projection means, the detector means for detecting the received energy; and polarization control means disposed in optical flow communication between the projection means and the detector means, the polarization control means for controlling the polarization of the received energy for maximizing the amount of received energy provided to the detector means.

2. The viewing systems as in claim 1, further including video processor means electrically connected to the detector means, the video processor means for generating video in response to the detected received energy.

3. The viewing system as in claim 1, further including polarization servo means having an input coupled to an output of the detector means and an output connected to an input of the polarization control means, the polarization servo means for maximizing the amount of received energy that is provided to the detector means in response to the amount of energy detected by the detector means.

4. A viewing system for illuminating an object with illumination energy and for detecting energy reflected from the object, comprising:

first scanning means for scanning the illumination energy in a first predetermined direction to form first scanned illumination energy;

second scanning means for scanning the first scanned illumination energy in a second predetermined direction to form second scanned illumination energy, the second direction different from the first direction;

projection means for directing the second scanned illumination energy toward the object and for receiving energy reflected from the object;

detector means optically coupled to the projection means, the detector means for detecting the received energy;

first synch pulse generator means for generating a first synch signal in response to the second scanned illumination energy, the first synch signal indicative of the end of a scan in the first predetermined direction; and second synch pulse generator means for generating a second synch signal in response to the second scanned illumination energy, the second synch signal indicative of the end of a scan in the second predetermined direction, wherein the first and second synch signals are supplied to the detector means for delimiting the extent of scan in the first and second direction, respectively.

5. The viewing system as in claim 4, wherein the first and second synch signal include a respective portion of the second scanned illumination energy.

6. The illumination system as in claim 4, wherein the first and second energy scanning means include a respective first and second plurality of rotatable energy reflective elements, the first plurality of elements rotatable at a nominal first predetermined rate and the second plurality of elements rotatable at a nominal second predetermined rate, the first plurality of elements for receiving illumination energy and for reflecting the received illumination energy as the first scanned illumination, the second plurality of elements for receiving the first scanned illumination and for reflecting the received first scanned illumination as the second scanned illumination, when the first and second plurality of elements are rotating, wherein synchronization between the first and second rate is not necessary.

7. A viewing system for illuminating an object with illumination energy and for detecting energy reflected from the object, comprising:

first scanning means for scanning the illumination energy in a first predetermined direction to form first scanned illumination energy;

second scanning means for scanning the first scanned illumination energy in a second predetermined direction to form second scanned illumination energy, the second direction different from the first direction;

projection means for directing the second scanned illumination energy toward the object and for receiving energy reflected form the object;

detector means optically coupled to the projector means, the detector means for detecting the received energy;

first synch pulse generator means for generating a first synch signal in response to the second scanned illumination energy, the first synch signal indicative of the send of a scan in the first predetermined direction; and second synch pulse generator means for generating a second synch signal in response to the second scanned illumination energy, the second synch signal indicative of the end of a scan in the second predetermined direction, wherein the first and second synch signal include a respective portion of the second scanned illumination energy and further wherein the first synch pulse generator means include first reflecting means and the second synch pulse generator means include second reflecting means, the first and second reflecting means respectively for reflecting the respective portion of the second scanned illumination energy.

8. A method for illuminating an object and for detecting energy reflected from the object, comprising:

scanning an illumination energy in a first predetermined direction to form first scanned illumination energy;

scanning the first scanned illumination energy in a second predetermined direction to form second scanned illumination energy, wherein the second direction is different from the first direction;

directing the second scanned illumination toward the object;

receiving energy reflected from the object;

detecting the received energy, and controlling the polarization of received energy before detecting for maximizing the amount of received energy available for detecting.

9. The method as in claim 8, further including the step of generating video in response to energy detected.

10. A method of illuminating an object and for detecting energy reflected from the object, comprising:
scanning an illumination energy in a first predetermined direction to form first scanned illumination energy;
scanning the first scanned illumination energy in a second predetermined direction to form second scanned illumination energy, wherein the second direction is different from the first direction;
directing the second scanned illumination toward the object;
receiving energy reflected from the object;
detecting the received energy;
generating a first synch signal in response to the second scanned illumination energy, the first synch signal indicative of the end of a scan in the first predetermined direction; and
generating a second synch signal in response to the second scanned illumination energy, the second synch signal indicative of the end of a scan in the second predetermined direction,
wherein the step of detecting includes detecting the first and second synch signals for delimiting the extent of scan in the first and second direction, respectively.

11. A method for illuminating an object and for detecting energy reflected from the object, comprising:
scanning the illumination energy in a first predetermined direction to form first scanned illumination energy;
scanning the first scanned illumination energy in a second predetermined direction to form second scanned illumination energy, wherein the second direction is different from the first direction;
directing the second scanned illumination toward the object;
receiving energy reflected from the object;
detecting the received energy;
generating a first synch signal in response to the second scanned illumination energy, the first synch signal indicative of the end of a scan in the first predetermined direction; and
generating a second synch signal in response to the second scanned illumination energy, the second synch signal indicative of the end of a scan in the second predetermined direction,
wherein the step of detecting includes detecting the first and second synch signals for delimiting the extent of scan in the first and second direction respectively and further wherein the steps of generating a first synch signal and a second synch signal respectively include reflecting a respective portion of the second scanned illumination.

* * * * *